US009126110B2

(12) United States Patent
Narita

(10) Patent No.: US 9,126,110 B2
(45) Date of Patent: Sep. 8, 2015

(54) CONTROL DEVICE, CONTROL METHOD, AND PROGRAM FOR MOVING POSITION OF TARGET IN RESPONSE TO INPUT OPERATION

(75) Inventor: Kuniaki Narita, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 437 days.

(21) Appl. No.: 13/235,996

(22) Filed: Sep. 19, 2011

(65) Prior Publication Data

US 2012/0202596 A1 Aug. 9, 2012

(30) Foreign Application Priority Data

Feb. 8, 2011 (JP) .................................. 2011-024549

(51) Int. Cl.
*A63F 13/20* (2014.01)
(52) U.S. Cl.
CPC ............ *A63F 13/06* (2013.01); *A63F 2300/105* (2013.01); *A63F 2300/1006* (2013.01); *A63F 2300/6045* (2013.01)
(58) Field of Classification Search
CPC .......................... A63F 9/24; A63F 2009/2401
USPC ...................................... 463/16, 36
See application file for complete search history.

(56) References Cited

U.S. PATENT DOCUMENTS 6,545,661 B1 * 4/2003 Goschy et al. ................ 345/158
8,068,096 B2 11/2011 Taira
8,801,521 B2 8/2014 Haga
2001/0044334 A1 * 11/2001 Kuri ................................ 463/4
2007/0060228 A1 * 3/2007 Akasaka et al. .................. 463/1
2007/0060391 A1 * 3/2007 Ikeda et al. ...................... 463/46
2007/0254738 A1 * 11/2007 Sato .............................. 463/31
2007/0257884 A1 11/2007 Taira
2007/0265104 A1 11/2007 Haga
2007/0270215 A1 * 11/2007 Miyamoto et al. .............. 463/32
2008/0009332 A1 * 1/2008 Kake ................................ 463/7

(Continued)

FOREIGN PATENT DOCUMENTS

JP 11156050 A 6/1999
JP 2007061489 A 3/2007

(Continued)

OTHER PUBLICATIONS

Office Action for corresponding JP application No. 2011-024549, dated Aug. 12, 2014.
Reconsideration report for corresponding JP application No. 2011-024549, dated Mar. 6, 2015.

*Primary Examiner* — David L Lewis
*Assistant Examiner* — Shauna-Kay Hall
(74) *Attorney, Agent, or Firm* — Matthew B. Dernier, Esq.

(57) ABSTRACT

A game device comprises: a first receiving unit configured to receive an input direction from a controller comprising an input interface for accepting an input direction in which to move a target displayed on a screen of a display device; a second receiving unit configured to receive, from a sensor that detects the position or the attitude of the controller, information relating to the position and the attitude of the controller; and a movement control unit configured to move the position of the target based on both of the direction received by the first receiving unit and the information relating to the position or the attitude of the controller received by the second receiving unit.

8 Claims, 3 Drawing Sheets

(56) References Cited

U.S. PATENT DOCUMENTS

| | | |
|---|---|---|
| 2008/0070684 A1* | 3/2008 | Haigh-Hutchinson ......... 463/32 |
| 2008/0120057 A1* | 5/2008 | Fukushima et al. ........... 702/104 |
| 2010/0001952 A1* | 1/2010 | Hiratake et al. .............. 345/158 |
| 2010/0009754 A1* | 1/2010 | Shimamura et al. ............ 463/37 |
| 2010/0160045 A1* | 6/2010 | Yamada et al. ................. 463/37 |
| 2010/0279770 A1* | 11/2010 | Ikeda ............................. 463/32 |
| 2010/0323783 A1* | 12/2010 | Nonaka et al. .................. 463/23 |

FOREIGN PATENT DOCUMENTS

| | | |
|---|---|---|
| JP | 2007293191 A | 11/2007 |
| JP | 2007296248 A | 11/2007 |
| JP | 2007300953 A | 11/2007 |

* cited by examiner

CONTROL DEVICE, CONTROL METHOD, AND PROGRAM FOR MOVING POSITION OF TARGET IN RESPONSE TO INPUT OPERATION

BACKGROUND OF THE INVENTION

1. Field of the Invention

The present invention relates to technology for controlling, and more particularly, to control devices, control methods, and programs for moving the position of a target in accordance with an operation input through an input device.

2. Description of the Related Art Background Technology

On a two-dimensional game screen or in a three-dimensional game field, direction keys, analogue sticks or the like are generally used as an input interface for moving characters, objects, or the like. Recently, an input interface where a player holds a remote controller capable of communicating with a game device wirelessly and inputs a movement direction by giving a tilt or the like to the controller itself has made its debut (see, for example, patent document No. 1).

RELATED ART LIST

[patent document 1] U.S. Patent application 2008/0120057

The present inventor attained an idea on technology for further increasing the user operability of a user interface where the position of a target is moved by using an input device.

SUMMARY OF THE INVENTION

In this background, a purpose of the present invention is to provide a user interface with easier operability.

According to an embodiment of the present invention, a control device is provided. The control device comprises: a first receiving unit configured to receive an input direction from an input device comprising a directional input unit for accepting an input direction in which to move a target displayed on a screen of a display device; a second receiving unit configured to receive, from a sensor that detects a position or an attitude of the input device, information relating to the position and the attitude of the input device; and a movement control unit configured to move the position of the target based on both e direction received by the first receiving unit and the information relating to the position or the attitude of the input device received by the second receiving unit.

Optional combinations of the aforementioned constituting elements, and implementations of the invention in the form of methods, apparatuses, systems, or the like may also be practiced as additional modes of the present invention.

DETAILED DESCRIPTION OF THE INVENTION

The invention will now be described by reference to the preferred embodiments. This does not intend to limit the scope of the present invention, but to exemplify the invention.

An explanation will be given on technology for moving a subject (e.g., a character, an object, cross hairs of a gun sight, or the like) to be displayed on a screen of a display device by using an input device comprising an interface capable of receiving an input direction (e.g., an analogue stick, a directional key, or the like), and a sensor for detecting a position or an attitude (e.g., an acceleration sensor, a gyroscope, or the like). In the present embodiment, an explanation will be given for an example of a game where a character is to be shot by a gun and the cross hairs of the gun displayed on a screen image is moved.

Figure 1:
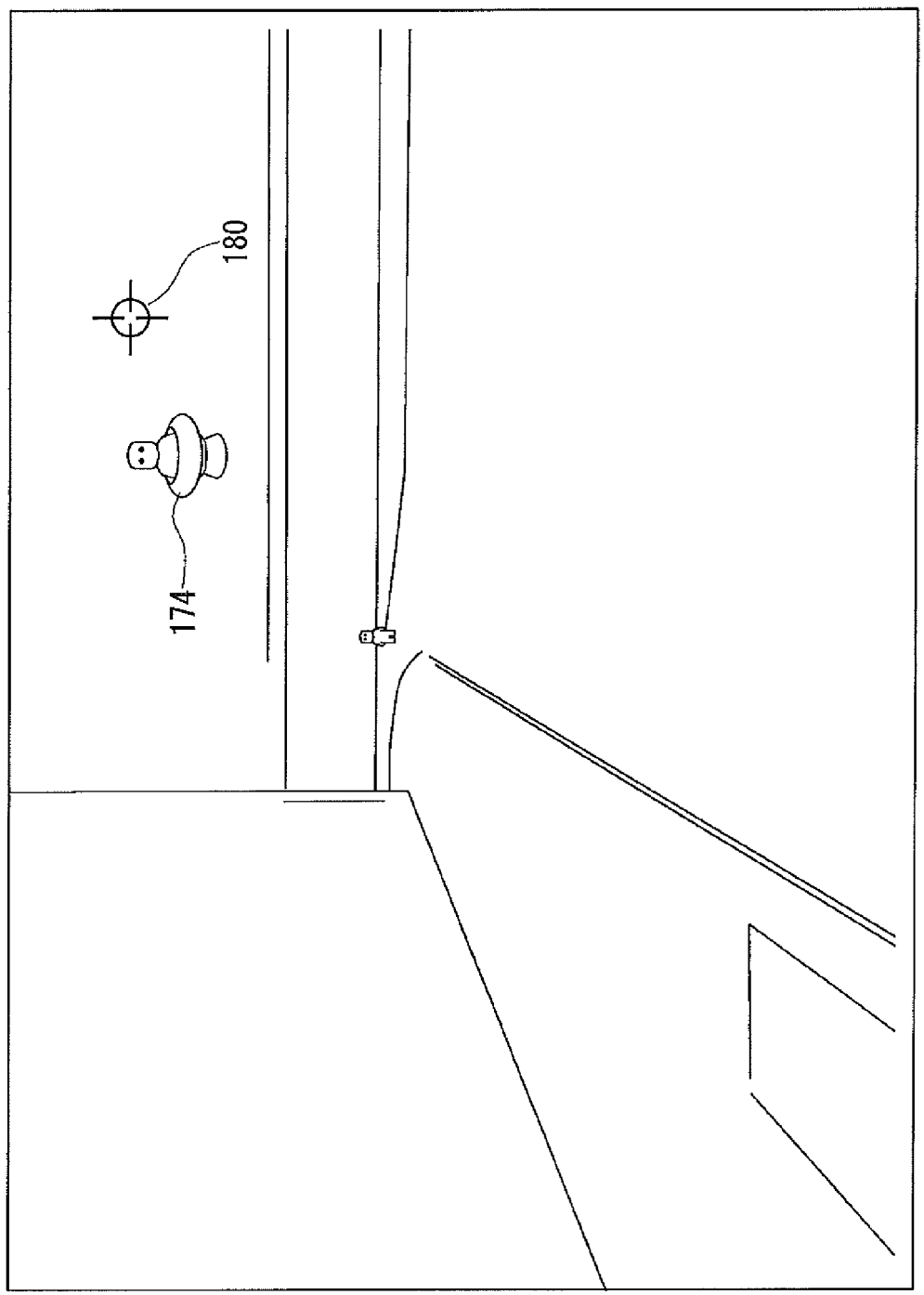
FIG. 1 shows an exemplary screen image of the game controlled by a game device according to an embodiment.

FIG. 1 shows an exemplary screen image of a game controlled by a game device according to an embodiment. On the screen image of the game, a game field where a character 174 is placed and cross hairs 180 operated by a player are displayed. The player operates a controller so as to move the cross hairs 180 upward, downward, leftward, or rightward direction on the game screen image, and so as to shoot the character while adjusting the cross hairs 180 on the character 174 and defeats the character 174.

Figure 2:
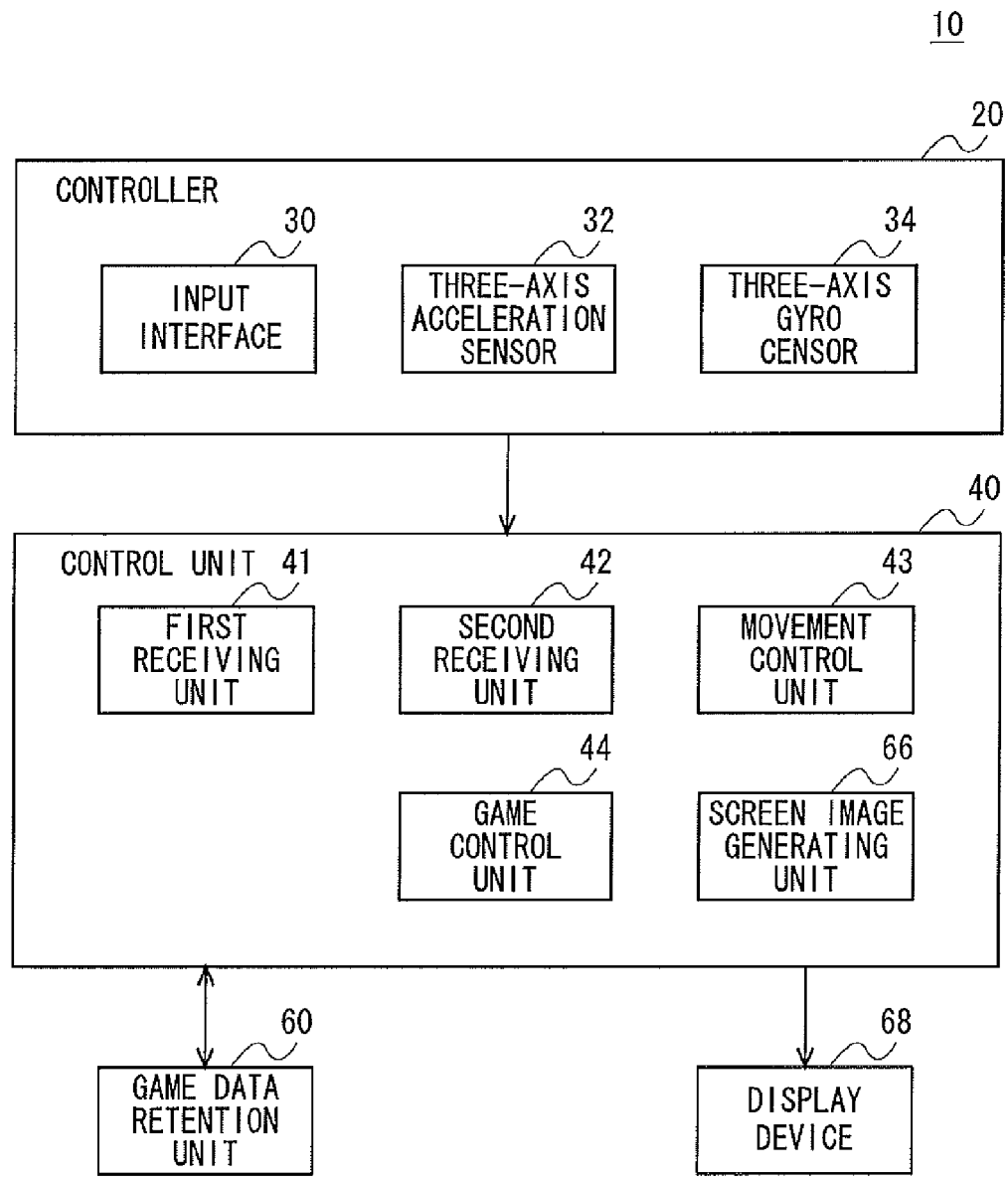
FIG. 2 shows a structure of the game device according to the embodiment.

FIG. 2 shows a structure of a game device 10 according to the embodiment. The game device 10 comprises a controller 20, a control unit 40, a game data retention unit 60, and a display device 68. The controller 20 includes an input interface 30, a three-axis acceleration sensor 32, and a three-axis gyro sensor 34. The control unit 40 includes a first receiving unit 41, a second receiving unit 42, a movement control unit 43, a game control unit 44, and a screen image generating unit 66. These blocks may be implemented, in terms of hardware components, by elements such as a CPU of a computer, memory, a program loaded onto memory, or the like. FIG. 2 depicts functional blocks implemented by cooperation of these blocks. Therefore, it will be obvious to those skilled in the art that the functional blocks may be implemented in a variety of ways, such as by hardware only, software only, or a combination thereof.

Figure 3:
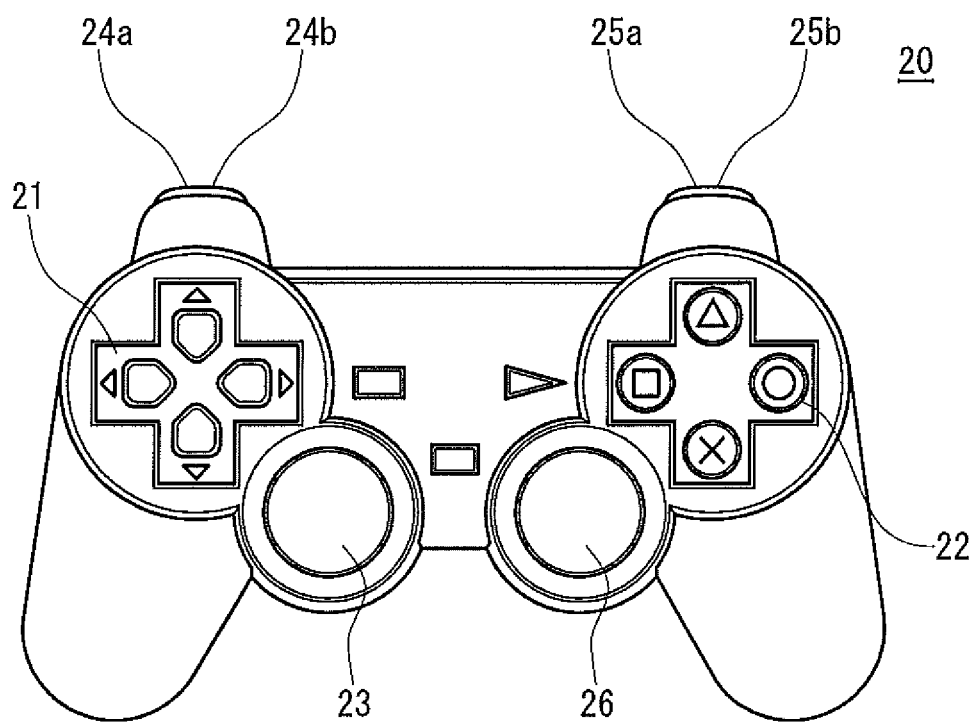
FIG. 3 shows an appearance of a controller.

FIG. 3 shows the appearance of the controller 20. On the upper surface of the controller 20, directional keys 21, buttons 22 including a triangle button, a square button, a circle button, and a cross button, and analogue sticks 23 and 26 are provided as the input interface 30. On the side surface of the controller 20, L1 button 24a, L2 button 24b, R1 button 25a, and R2 button 25b are provided as the input interface 30. According to the embodiment, a function for moving the cross hairs in the direction designated by an input is assigned to the analogue stick 23 and a function for shooting the gun is assigned to the buttons 22, respectively.

The three-axis acceleration sensor 32 incorporates a mass supported by a beam. By detecting the change of the position of the mass caused by an acceleration, the three-axis acceleration sensor 32 detects the acceleration of the controller 20 in each of the three-axis direction, X, Y, and Z. The three-axis acceleration sensor 32 may be a mechanical, optical, or semiconductor acceleration sensor. By using the three-axis acceleration sensor 32, the relative angle made by each of the three axes X Y and Z of the controller 20 with the direction of the gravitational acceleration can be detected, which enables the calculation of the attitude of the controller 20. By integrating the acceleration of each of the three axes X Y and Z, velocities can be calculated, and by further integrating, the distance of movement can be calculated.

The three-axis gyro sensor 34 detects the angular speed of the controller 20 in each of the XZ plane, ZY plane, and YX plane. The three-axis gyro sensor 34 may be a mechanical gyro sensor such as a vibration gyro or rotor gyro, or may be an optical gyro sensor or a fluidic gyro sensor. By integrating the angular speed around each of the three axes detected by the three-axis gyro sensor 34, a rotation amount around each of the three axes can be calculated. An input signal received by the input interface 30 and sensor signals detected by the three-axis acceleration sensor 32 and the three-axis gyro sensor 34 are transmitted to the game device 10 in a predetermined time cycle.

The game control unit 44 executes a game program based on an input signal and the sensor signals received from the controller 20 operated by the player and control the game. The game data retention unit 60 retains data such as data on the game field, data on the characters and the objects placed in the game field, or the like. The screen image generating unit 66 generates a screen image of the game, the screen image controlled by the game control unit 44, and allows the display device 68 to display the screen image.

The first receiving unit 41 receives, via the analogue stick 23, an input of the direction and the speed for allowing the cross hairs to move. The first receiving unit 41 receives the direction in which the analogue stick 23 is inclined as the direction in which to move the cross hairs, and receives the angle of which the analogue stick 23 is inclined as the speed at which to move the cross hairs, respectively. The movement control unit 43 allows the cross hairs to move in the direction in which the analogue stick 23 is inclined and at a speed in accordance with the angle of which the analogue stick 23 is inclined.

The second receiving unit 42 receives information regarding the position or the posture of the controller 20 from the three-axis acceleration sensor 32 and the three-axis gyro sensor 34. The second receiving unit 42 receives the direction in which the controller 20 is inclined or moved as the direction in which to move the cross hairs, and receives the changes of the position or the angle of the controller 20 as the movement distance of the cross hairs, respectively. The movement control unit 43 allows the cross hairs to move in the direction in which the controller 20 is moved or inclined, through a distance in accordance with the change of the position or the angle of the controller 20.

The movement control unit 43 retains a coordinate value on the game screen image that designates the current position of the cross hairs. Every time the screen image generating unit 66 generates one frame of screen image, the movement control unit 43 calculates the position of the cross hairs in the generated frame and updates the current position of the cross hairs. First, in case the analogue stick 23 is inclined, the movement control unit 43 calculates a first vector indicating the movement distance of the cross hairs for each one frame, and adds the calculated values to the coordinate values of the cross hairs. The direction of the first vector is defined as the direction in which the analogue stick 23 is inclined, and the magnitude of the first vector is defined in accordance with the angle of which the analogue stick 23 is inclined. Further, in case the position or the angle of the controller 20 is changed in the amount equal to or greater than a predetermined amount during a period for immediately-previous one frame or a predetermined number of frames, the movement control unit 43 calculates a second vector indicating the movement distance of the cross hairs for each one frame, and adds the calculated values to the coordinate values of the cross hairs. The direction of the second vector is defined as the direction in which the position or the angle of the controller 20 is changed, and the magnitude of the second vector is defined in accordance with the variation of the position or the angle of the controller 20. This enables the calculation of the position of the cross hairs in the next frame.

The movement control unit 43 may define the position of the controller 20 at a predetermined time as a reference position and may calculate a variation of the position relative to the reference position. In a similar manner, the movement control unit 43 may define the attitude of the controller 20 at a predetermined time as a reference attitude and may calculate a variation of the angle relative to the reference angle. The predetermined time may be, for example, when the power of the game device 10 or the controller 20 is switched on, when a game to be executed by the game control unit 44 is started, when the game control unit 44 executes a calibration for determining the reference angle or the reference attitude of the controller 20, when a operation mode is changed in the game control unit 44, when a predetermined operation is input through the input interface 30 of the controller 20, when no operation is input through the input interface 30 for a time period greater than or equal to a predetermined time period, when the position or the attitude of the controller 20 is not changed for a time period greater than or equal to a predetermined time period, etc. The movement control unit 43 may define an attitude wherein the upper surface of the controller 20 shown in FIG. 3 is horizontal in the real word as the reference attitude and may calculate the angle of the controller 20 to the horizontal surface.

In this way, according to the embodiment, the player can move the position of the target either by manipulating the analogue stick or by changing the position or the attitudes of the controller. In case of manipulating the analogue stick, while the analogue stick is inclined, the target keeps moving in the direction in which the analogue stick is inclined. Meanwhile, in case of changing the position or the attitude of the controller itself, the target moves through a distance of just the amount of the change of the position or the attitude of the controller from the reference position or the reference attitudes. Therefore, the player may use the analogue stick if desiring to move the target widely, and the player may change the position or the attitude of the controller if desiring to move the target slightly and to fine-adjust the position. In this way, by providing a plurality of operation methods of different sensibilities for moving the position of a same target, a user interface for easier operability can be provided. Further, in case of moving the cross hairs by changing the position or the attitude of the controller, the cross hairs can be moved just the amount in accordance with the change of the position or the attitudes, regardless of the speed of the change of the position or the attitude. Therefore, a user interface that can fine-adjust the position readily can be provided.

In case the position or the attitudes of the controller 20 does not change by an amount greater than or equal to a predetermined amount in a predetermined time period, the movement control unit 43 does not move the position of the target. This can prevent slight hand movement of the player from being reflected to the position of the target. It is also possible to reflect the slight hand movement of the player to the change of the position of the target to a certain extent, by adjusting a threshold values determining whether or not to move the target with respect to the change of the position or the attitudes of the controller 20. This can present an effect as though the player actually holds a gun. The movement control unit 43 may move the viewpoint position of a camera when rendering the game field. In this case, an effect as though the player actually holds a camera can be presented.

Given above is an explanation based on the exemplary embodiment. The embodiment is intended to be illustrative only and it will be obvious to those skilled in the art that various modifications to constituting elements and processes could be developed and that such modifications are also within the scope of the present invention.

According to the embodiment, the position and the attitude of the controller is detected by using the three-axis acceleration sensor and the three-axis gyro sensor. However, the position or the attitude of the controller may be detected by using any known technology. For example, the position or the attitude of the controller may be detected by capturing the controller by a camera.

According to the embodiment, the explanation is given for an example where the cross hairs displayed on the game screen image is moved by an input through the analogue stick and the change of the position or the attitude of the controller. However, according to another example, the cross hairs may be fixed to a predetermined position on the screen image and the line of sight or the position of the viewpoint used when generating the game screen image may be changed. Also in this case, the line of sight or the position of the viewpoint may be changed widely by an input through the analogue stick or the like, and the line of sight or the position of viewpoint may be changed slightly by the change of the position or the attitude of the controller. Alternatively, the line of sight may be changed by an input via the analogue stick or the like, and the position of viewpoint may be changed by the change of the position or the attitude of the controller. In contrast, the position of viewpoint may be changed by an input via the analogue stick or the like, and the line of sight may be changed by the change of the position or the attitude of the controller. Furthermore, the line of sight or the position of viewpoint may be changed by an input via the analogue stick or the like, and the position of the target on the game screen image may be changed by the change of the position or the attitude of the controller. In contrast, the position of the target on the game screen image may be changed by an input via the analogue stick or the like, and the line of sight or the position of viewpoint may be changed by the change of the position or the attitude of the controller.

According to the embodiment, the explanation is given for a stationary game console provided with a controller. However, according to another example, the game device may be a portable game console. In this case, constituents for detecting the position or the attitude of the main body of the game device (e.g., a three-axes acceleration sensor, a three-axes gyro sensor, or the like) is provided on the main body of the game device comprising a display device and an input interface, such as an analogue stick, or the like. Also in this case, the position of a target is controlled based on both of an input of a direction via the analogue stick or the like and the position and the attitude of the main body of the game device, in a similar way to the embodiment.

What is claimed is:

1. A control device, comprising:
   a first receiving unit configured to receive an input direction from an input device comprising a directional input unit for accepting an input direction in which to move a target displayed on a screen of a display device;
   a second receiving unit configured to receive, from a sensor that detects a position or an attitude of the input device, information relating to the position and the attitude of the input device; and
   a movement control unit configured to move the position of the target based on both the direction received by the first receiving unit and the information relating to the position or the attitude of the input device received by the second receiving unit, wherein
   the first receiving unit receives an input direction and an input speed value from the directional input unit which is capable of accepting the input direction in which to move the target and the input speed value at which to move the target,
   the second receiving unit receives a direction of a movement or a direction of a rotation of the input device and an amount of variation with respect to the position and the attitude of the input device at a predetermined time point as a reference,
   the movement control unit moves the position of the target in the direction received by the first receiving unit at the speed received by the first receiving unit and concurrently moves the position of the target in the direction received by the second receiving unit by the amount in accordance with the amount of variation received by the second receiving unit, and
   in the case where the amount of variation of the movement or the rotation of the input device received by the second receiving unit is greater than or equal to a predetermined amount, the movement control unit moves the position of the target in the direction received by the second receiving unit by the amount in accordance with the amount of variation received by the second receiving unit.

2. The control device according to claim 1, wherein the directional input unit includes an analogue stick capable of accepting the input direction in which to move the target and the input speed value at which to move the target.

3. A non-transitory computer-readable recording medium containing a computer program, comprising:
   a module configured to receive, using a first receiving unit, an input direction from an input device comprising a directional input unit for accepting an input direction in which to move a target displayed on a screen of a display device;
   a module configured to receive, using a second receiving unit, from a sensor that detects a position or an attitude of the input device, information relating to the position and the attitude of the input device; and
   a module configured to move, using a movement control unit, the position of the target based on both the direction received by the first receiving unit and the information relating to the position or the attitude of the input device received by the second receiving unit, wherein
   the first receiving unit receives an input direction and an input speed value from the directional input unit which is capable of accepting the input direction in which to move the target and the input speed value at which to move the target,
   the second receiving unit receives a direction of a movement or a direction of a rotation of the input device and an amount of variation with respect to the position and the attitude of the input device at a predetermined time point as a reference, and
   the movement control unit moves the position of the target in the direction received by the first receiving unit at the speed received by the first receiving unit and concurrently moves the position of the target in the direction received by the second receiving unit by the amount in accordance with the amount of variation received by the second receiving unit, and
   in the case where the amount of variation of the movement or the rotation of the input device received by the second receiving unit is greater than or equal to a predetermined amount, the movement control unit moves the position of the target in the direction received by the second receiving unit by the amount in accordance with the amount of variation received by the second receiving unit.

4. The computer program according to claim 3, wherein the directional input unit includes an analogue stick capable of accepting the input direction in which to move the target and the input speed value at which to move the target.

5. A control method, comprising:
  receiving an input direction by a first receiving unit from an input device comprising a directional input unit for accepting an input direction in which to move a target displayed on a screen of a display device;
  receiving by a second receiving unit, from a sensor that detects a position or an attitude of the input device, information relating to the position and the attitude of the input device; and
  moving, by a movement control unit, the position of the target based on both the direction received by the first receiving unit and the information relating to the position or the attitude of the input device received by the second receiving unit, wherein
  the first receiving unit receives an input direction and an input speed value from the directional input unit which is capable of accepting the input direction in which to move the target and the input speed value at which to move the target,
  the second receiving unit receives a direction of a movement or a direction of a rotation of the input device and an amount of variation with respect to the position and the attitude of the input device at a predetermined time point as a reference,
  the movement control unit moves the position of the target in the direction received by the first receiving unit at the speed received by the first receiving unit and concurrently moves the position of the target in the direction received by the second receiving unit by the amount in accordance with the amount of variation received by the second receiving unit, and
  in the case where the amount of variation of the movement or the rotation of the input device received by the second receiving unit is greater than or equal to a predetermined amount, the movement control unit moves the position of the target in the direction received by the second receiving unit by the amount in accordance with the amount of variation received by the second receiving unit.

6. The control method according to claim 5, wherein the directional input unit includes an analogue stick capable of accepting the input direction in which to move the target and the input speed value at which to move the target.

7. A non-transitory computer-readable recording medium having embodied thereon a computer program, which when executed by a processor causes the processor to carry out actions, comprising:
  receiving an input direction by a first receiving unit from an input device comprising a directional input unit for accepting an input direction in which to move a target displayed on a screen of a display device;
  receiving by a second receiving unit, from a sensor that detects a position or an attitude of the input device, information relating to the position and the attitude of the input device; and
  moving, by a movement control unit, the position of the target based on both the direction received by the first receiving unit and the information relating to the position or the attitude of the input device received by the second receiving unit, wherein
  the first receiving unit receives an input direction and an input speed value from the directional input unit which is capable of accepting the input direction in which to move the target and the input speed value at which to move the target,
  the second receiving unit receives a direction of a movement or a direction of a rotation of the input device and an amount of variation with respect to the position and the attitude of the input device at a predetermined time point as a reference,
  the movement control unit moves the position of the target in the direction received by the first receiving unit at the speed received by the first receiving unit and concurrently moves the position of the target in the direction received by the second receiving unit by the amount in accordance with the amount of variation received by the second receiving unit, and
  in the case where the amount of variation of the movement or the rotation of the input device received by the second receiving unit is greater than or equal to a predetermined amount, the movement control unit moves the position of the target in the direction received by the second receiving unit by the amount in accordance with the amount of variation received by the second receiving unit.

8. The non-transitory computer-readable recording medium according to claim 7, wherein the directional input unit includes an analogue stick capable of accepting the input direction in which to move the target and the input speed value at which to move the target.

* * * * *